United States Patent [19]

Smith

[11] Patent Number: 5,131,037

[45] Date of Patent: Jul. 14, 1992

[54] CALL CLIP

[76] Inventor: James T. Smith, 4069 St Pierre Blvd #2, Memphis, Tenn. 38122

[21] Appl. No.: 660,007

[22] Filed: Feb. 25, 1991

[51] Int. Cl.$^5$ .............................................. H04M 1/00
[52] U.S. Cl. .................... 379/447; 379/448; 379/450; 379/425
[58] Field of Search ............ 379/447, 448, 450, 420, 379/422, 424, 425, 426, 427

[56] References Cited

U.S. PATENT DOCUMENTS

| | | | |
|---|---|---|---|
| 3,715,525 | 2/1973 | Fielding | 379/450 |
| 4,131,768 | 12/1978 | Wood | 379/447 |
| 4,379,953 | 4/1983 | Haff | 379/447 |
| 4,536,622 | 8/1985 | Rieman | 379/422 |
| 4,742,542 | 5/1988 | Jantzi | 379/420 |

*Primary Examiner*—James L. Dwyer
*Assistant Examiner*—Jack Chiang
*Attorney, Agent, or Firm*—Nies, Kurz, Bergert & Tamburro

[57] ABSTRACT

A telephone switch depressor that includes a planar wedge panel that includes a tapered, planar wedge end that is adapted to be received between a telephone flash switch and the opening through which the switch extends. The depressor serves to hold the flash button in its depressed condition, to disconnect the telephone line from a handset, and to avoid the need to physically replace the handset on the base or rest in order to actuate a switch hook to cause disconnection of the handset from the telephone line. The wedge panel can be formed from a flexible, yet sufficiently rigid plastic material, and it can be adapted to carry printed information.

8 Claims, 1 Drawing Sheet

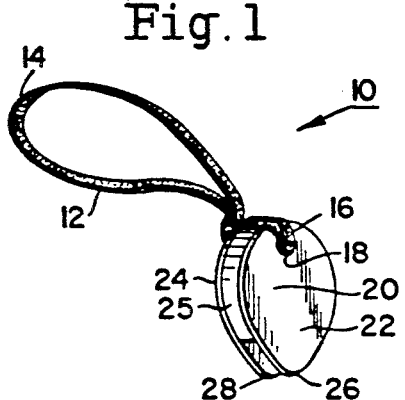
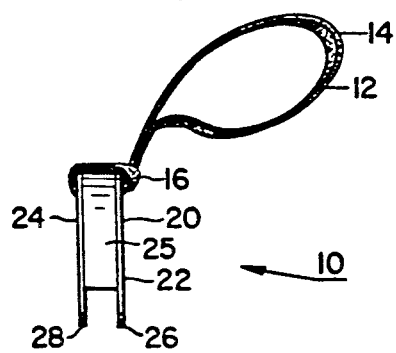
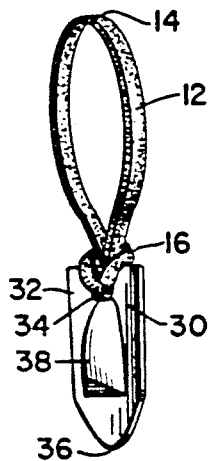
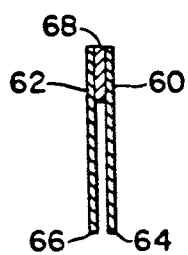
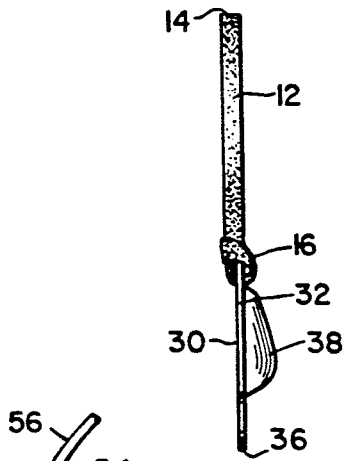
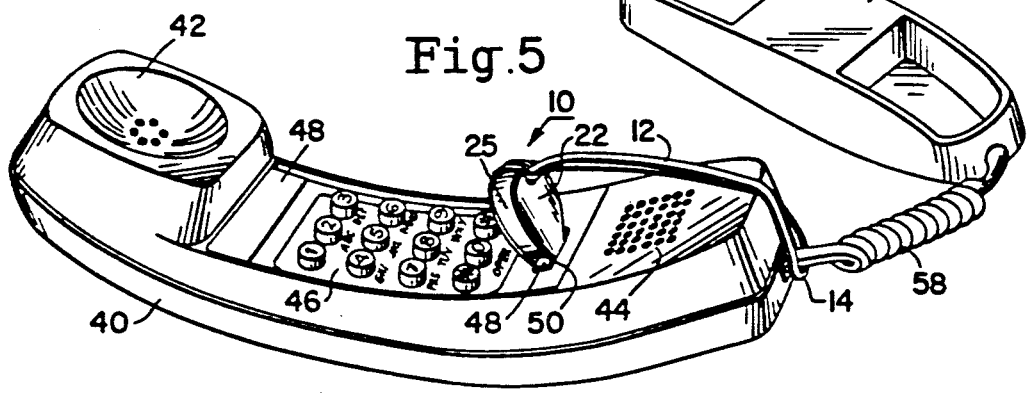

CALL CLIP

BACKGROUND OF THE INVENTION

1. Field of the Invention

The present invention relates to a device for depressing a telephone-mounted switch, and more particularly to a switch depressor that can be used with a telephone-handset-mounted line disconnect switch to depress and retain the switch in a depressed position so that the telephone line is in the open, call-receiving condition, and to avoid the need to replace the handset on its base or cradle.

2. Description of the Related Art

In order to disable a telephone line connection between the caller and a party being called, the telephone handset must normally be replaced on its base or rest in order that the handset can bear against and depress a line switch to effect the disconnection, and thereby permit the telephone instrument to be in condition to make or receive a subsequent telephone call. Some telephones that include the dialing mechanism in the handset, along with a mouthpiece and a listening portion, include a depressible switch between the dialing device and the mouthpiece in order to permit convenient manual disconnection of the telephone line, and thereby avoid the need to return the handset to its base or rest in order to make the disconnection.

When a telephone user has completed his calls and no longer wishes to use the instrument to place calls, he is required to return the handset to its base or rest, in order to disconnect the telephone line and permit the instrument to receive incoming calls. To avoid the need to replace the handset on its base or cradle, which might be located at a distance from the user, it is desirable that some provision be made to cause the line disconnect switch on the handset to be maintained in the depressed condition. In that regard, several approaches have been suggested to obtain that effect. For example, in U.S. Pat. No. 4,034,167, granted on Jul. 5, 1977, to Albert E. Boyd, there is disclosed a telephone switch retaining device including an adjustable band that surrounds the handset and that carries a depressing member that can selectively be placed into contact with the line disconnect switch in order to depress the switch and avoid the need to return the handset to its base or rest.

Another approach to permitting a handset line disconnect button to be maintained in a depressed condition is disclosed in U.S. Pat. No. 4,131,768, which issued Sep. 26, 1978, to Reggie D. Wood. That patent discloses a clip member that surrounds the handset and that is movable along the length of the handset to and from a position in contact with the line disconnect switch. The clip includes a projection that is adapted to be selectively placed into or out of contact with the line disconnect switch, so that when the projection is in contact with the switch the switch is depressed and is maintained in a depressed position.

Although devices that are intended to permit disconnection of a telephone line without requiring return of the handset to its base or rest have been disclosed, the known devices are inconvenient to use and are required to be maintained on the handset, which could render uncomfortable the holding of the handset for a protracted period of time. Additionally, the prior art devices are generally so positioned that they are adjacent to the mouthpiece portion of the handset, and when moved out of contact with the line disconnect switch, to permit use of the telephone, they could inadvertently overlie and possibly block a portion of the mouthpiece.

It is an object of the present invention to overcome the deficiencies in the prior art devices and to provide an improved telephone switch depressor that is simple to use, that is economical, and that does not interfere with the convenient use of a telephone handset.

SUMMARY OF THE INVENTION

Briefly stated, in accordance with one aspect of the present invention, a telephone switch depressor and locking member is provided. The depressor includes a wedge panel having a thin, outwardly extending lip that defines a wedge end adapted to be inserted into a gap between a switch opening and a depressible, outwardly biased switch member that extends through and is movable into and out of the switch opening between an outer, released position and an inner, depressed position relative to the switch opening. The lip has a thickness and rigidity sufficient to permit the wedge end to be inserted into the gap between the switch member and the switch opening to depress the switch member and to hold the switch member in a depressed condition. When in position, the depressor permits the switch to be retained in an inner, depressed position, relative to the switch opening, to avoid the need to replace the telephone handset on its base or cradle. Optionally, a flexible connecting band can be provided, the band having first and second ends, wherein the first end is received on or looped around the telephone cord extending from the telephone handset to retain the depressor near the handset and in a ready-for-use position.

BRIEF DESCRIPTION OF THE DRAWINGS

FIG. 1 is a front perspective view showing one form of telephone switch depressor in accordance with the present invention.

FIG. 2 is a side view of the embodiment illustrated in FIG. 1.

FIG. 3 is a front perspective view of another embodiment of a telephone switch depressor in accordance with the present invention.

FIG. 4 is a side view of the embodiment shown in FIG. 3.

FIG. 5 is a perspective view of a telephone handset and base showing the embodiment of the invention as illustrated in FIGS. 1 and 2 in operative position to retain a telephone line disconnect switch in a depressed, open line position.

FIG. 6 is a side view similar to FIG. 2, in cross section, showing a still further embodiment of the present invention.

DESCRIPTION OF THE PREFERRED EMBODIMENTS

Referring now to the drawings, and particularly to FIGS. 1 and 2 thereof, there is shown a telephone switch depressor 10 that is adapted to maintain a spring-biased telephone line switch in a depressed condition. Depressor 10 includes a flexible connecting band 12 having a first end 14 that is free for connection with a telephone cord, as will be hereinafter described in greater detail. The second end 16 of connecting band 12 is received in an aperture 18 that is provided in depressor 10 adjacent one edge thereof.

Depressor 10 includes a wedge body 20 defined by a pair of spaced, substantially parallel wedge panels 22, 24 that are essentially planar panels that are spaced from each other by a spacer block 25. As best seen in FIG. 1, wedge panels 22, 24 can have a generally circular configuration, and preferably each wedge panel includes an outwardly extending, generally tapered wedge end, 26, 28, respectively. Each of wedge panels 22, 24 is so oriented that each of wedge ends 26, 28 extends in the same direction relative to wedge body 20.

Wedge panels 22, 24 can be made from any convenient material, and are preferably made from sheet plastic, such as polyethylene or polypropylene. Wedge ends 26, 28 can have a thickness of from about 0.010 inches to about 0.032 inches, in order to permit them to pass between a switch button and a switch opening, as will be hereinafter described. Preferably, the combination of material and wedge panel thickness is such as to provide a pair of wedge ends that have sufficient inherent strength and rigidity to permit the wedge ends to be passed into a gap between a switch button and an opening through which the switch button extends, and to be capable of being pressed into the gap without excessive lateral deflection or folding over upon themselves.

Spacer block 25 can also be of the same type of plastic material. However, it can also be made of any other convenient materials such as cork, wood, or the like. The purpose of spacer block 25 is to space the respective wedge panels 22, 24 from each other a distance that corresponds substantially with the corresponding dimension of a switch button.

Connecting band 12 in its preferred form can be an elastic, conventional rubber band, or, alternatively, it can be a cloth band, a rawhide band, a plastic band, or the like.

Another embodiment of the present invention is illustrated in FIGS. 3 and 4. That embodiment also has a connecting band 12, but only a single wedge panel 30 is provided, the panel as illustrated having a generally rectangular body 32 including an aperture 34. A thin wedge end 36 extends from one end of rectangular body 32. Wedge panel 30 can be a generally planar rectangular structure, as shown, or it can be any other convenient form.

On one side of wedge panel 30 a stop member 38 is provided to limit the extent to which wedge end 36 can be inserted into the gap between a switch button and a switch button opening. Again, the embodiment shown in FIGS. 3 and 4 can be made of any convenient materials, which can include plastics, and preferably has sufficient rigidity to permit wedge end 36 to maintain its shape and to be inserted into the switch-opening gap without significant lateral bending or folding over itself.

The operation of the present invention can be best understood by referring to FIG. 5, which shows a depressor 10 in accordance with the present invention, and having the configuration illustrated in FIGS. 1 and 2, in its operative position on a telephone handset 40. Handset 40 is an elongated structure and includes an earpiece 42 at one end and a mouthpiece 44 at the opposite end. Positioned between earpiece 42 and mouthpiece 44 is a dial mechanism 46, which, as shown, is in the form of a push-button dial pad. A telephone number plate 48 can be positioned between dial mechanism 46 and earpiece 42, if desired.

Positioned between dial mechanism 46 and mouthpiece 44 is a generally rectangular switch 48, sometimes referred to as a flash button, a portion of which extends outwardly through generally rectangular opening 50 provided in handset 40. Switch 48 is spring biased to an outer position, so that a portion of the switch button projects beyond the surrounding surface of handset 40. When switch 48 is in its outer position, the telephone circuitry housed within handset 40 is connected with the telephone line, and when switch 48 is depressed inwardly, the line connection is interrupted and earpiece 42 and mouthpiece 44 are disabled.

Typically, switch or flash button 48 is manually depressed when a user has completed a call and wishes to place another call without the need to replace handset 40 on base 52, to cause the switch hook 54 to be depressed in order to disconnect the circuitry contained within handset 40 from the telephone line 56.

When a user wishes to electrically disconnect handset 40 from telephone line 56 without the need to manually replace the handset on base 52 to cause switchhook 54 to be depressed, depressor 10 in accordance with the present invention can be employed as illustrated in FIG. 5. First end 14 of connecting band 12 can initially be looped around coiled telephone cord 58, so that the depressor is in a convenient position and available for immediate use. Depressor body 20 is then held in the hand in such a way that the wedge ends are directed toward handset 40, and the wedge ends are then inserted into the gap that exists between switch or flash button 48 and opening 50 in the surface of handset 40. The wedge ends frictionally cause switch or flash button 48 to be depressed and the resultant wedge action between switch 48 and opening 50 causes depressor 10 to be retained in the position illustrated in FIG. 5, to thereby hold switch 48 in its depressed condition and electrically disconnect handset 40 from telephone line 56. The user can then engage in other activities, without the need to replace handset 40 onto base 52.

As shown in FIG. 5, depressor 10 is the embodiment shown in FIGS. 1 and 2. In that regard, spacer block 25 preferably has a width that corresponds substantially with the top-to-bottom dimension of switch 48, the top-to-bottom dimension being the dimension of the switch as the switch is viewed when the handset is in use during a telephone conversation. However, if desired, spacer block 25 can have a different width.

When the telephone rings, or when the user wishes to use the telephone to place a call, handset 40 can again be electrically connected with telephone line 56 by removing depressor 10 so that the wedge ends are withdrawn from the gaps between switch 48 and opening 50. Switch 48 is thus permitted to return to its outermost position, thereby restoring the telephone line connection and permitting use of the handset in the normal manner.

The embodiment of the invention as illustrated in FIGS. 3 and 4 operates in a similar manner.

The embodiment of the invention as shown in FIG. 6 is similar to that of the embodiment of FIGS. 1 and 2, except that the FIG. 6 embodiment does not include a connecting band and it also does not include a spacer block. As seen in FIG. 6, the device is less bulky than the FIGS. 1 and 2 embodiment, and it includes a pair of similarly configured wedge panels 60, 62, which can have the same shape as wedge panels 22 and 24 of the embodiment shown in FIGS. 1 and 2. Panels 60 and 62 are joined together at the ends opposite tapered wedge ends 64, 66, respectively, by a layer of a suitable adhesive 68. Preferably, adhesive layer 68 does not extend over more than about one-half the top-to-bottom dimension of panels 60 and 62, to permit the wedge ends of the panels to be flexed outwardly away from each other so that the wedge ends can be easily separated for insertion into the gaps between the switch and switch opening. Additionally, the thickness of the adhesive layer provides a small gap or separation between the opposed inner faces of panels 60 and 62, to facilitate the separation of the wedge ends when applying the device to the handset switch.

It will be apparent that the present invention provides a simple yet convenient way of locking a telephone flash button in a depressed condition to avoid the need to replace the telephone handset on a telephone base. As will also be apparent, the wedge panels can include printed matter or other information on their outermost surfaces, which can include emergency telephone numbers, or the telephone numbers of restaurants or other business establishments.

Although particular embodiments of the present invention have been illustrated and described, it will be apparent to those skilled in the art that various changes and modifications can be made without departing from the spirit of the present invention. It is therefore intended to encompass in the appended claims all such changes and modifications that fall within the scope of the present invention.

What is claimed is:

1. A telephone switch depressor comprising a wedge member including a wedge panel having a thin, outwardly extending lip that defines a wedge end adapted to be inserted into a gap between a switch opening and a depressible, outwardly biased switch member that extends through and is movable into and out of the switch opening between an outer, released position and an inner, depressed position relative to the switch opening, wherein the lip has a thickness and rigidity sufficient to permit the wedge end to be inserted into the gap between the switch member and the switch opening to depress the switch member and to hold the switch member in a depressed condition.

2. A telephone switch depressor in accordance with claim 1 including a flexible connecting band having first and second ends spaced from each other and adapted to have the first end received on a telephone cord extending from a telephone handset and the second end connected with the wedge member.

3. A telephone switch depressor in accordance with claim 2 wherein the connecting band is elastic.

4. A telephone switch depressor in accordance with claim 1 wherein the wedge panel includes an outwardly facing, substantially planar surface adapted to carry printed information.

5. A telephone switch depressor in accordance with claim 1 wherein the lip is tapered and tapers outwardly from the wedge member to a narrowed outermost end.

6. A telephone switch depressor in accordance with claim 1 wherein the wedge panel includes a stop member spaced from the wedge end for limiting inward movement of the wedge panel into the gap between the switch member and switch opening.

7. A telephone switch depressor in accordance with claim 1 including a pair of wedge panels each including wedge lips terminating in wedge ends, the wedge lips positioned substantially parallel to and space-d from each other, and a spacer means positioned between the wedge panels and having a thickness sufficient to space the wedge ends a distance to permit the wedge ends to be inserted on opposite sides of and between the switch member and the switch opening to permit both wedge lips to be simultaneously inserted between the switch and the switch opening to retain the switch in a depressed condition.

8. A telephone switch depressor in accordance with claim 7 wherein the stop member is spaced inwardly from the wedge end.

* * * * *